(12) United States Patent
Inoue (10) Patent No.: US 8,047,963 B2
(45) Date of Patent: Nov. 1, 2011

(54) VEHICLE CONTROL APPARATUS

(75) Inventor: Yuji Inoue, Nissin (JP)

(73) Assignee: Toyota Jidosha Kabushiki Kaisha, Aichi (JP)

( * ) Notice: Subject to any disclaimer, the term of this patent is extended or adjusted under 35 U.S.C. 154(b) by 488 days.

(21) Appl. No.: 12/403,147

(22) Filed: Mar. 12, 2009

(65) Prior Publication Data

US 2009/0176619 A1  Jul. 9, 2009

Related U.S. Application Data

(63) Continuation-in-part of application No. PCT/JP2008/059526, filed on May 23, 2008.

(30) Foreign Application Priority Data

May 24, 2007 (JP) ................................. 2007-137688

(51) Int. Cl.
   *B60T 13/74* (2006.01)
(52) U.S. Cl. ........................................................ 477/197
(58) Field of Classification Search ........................ None
   See application file for complete search history.

(56) References Cited

U.S. PATENT DOCUMENTS

| | | | | |
|---|---|---|---|---|
| 5,675,190 A * | 10/1997 | Morita | ............................ | 307/10.1 |
| 5,919,112 A * | 7/1999 | Michael et al. | ................... | 477/99 |
| 6,702,405 B1 * | 3/2004 | Balz et al. | ....................... | 303/192 |
| 6,802,574 B2 * | 10/2004 | Ehrmaier et al. | ................ | 303/16 |
| 7,699,751 B2 * | 4/2010 | Barber et al. | .................. | 477/197 |
| 7,762,926 B2 * | 7/2010 | Peterson | ........................ | 477/172 |
| 7,815,546 B2 * | 10/2010 | Jagodzinski | .................. | 477/185 |
| 2008/0090702 A1 * | 4/2008 | Hopf et al. | ..................... | 477/197 |

FOREIGN PATENT DOCUMENTS

| | | |
|---|---|---|
| JP | 05-246266 A | 9/1993 |
| JP | 05-280637 A | 10/1993 |
| JP | 06-072296 A | 3/1994 |
| JP | 06-040513 U | 5/1994 |
| JP | 2005-069407 A | 3/2005 |
| JP | 2006-298248 A | 11/2006 |

* cited by examiner

*Primary Examiner* — Dirk Wright (74) *Attorney, Agent, or Firm* — Sughrue Mion, PLLC (57) ABSTRACT

Control apparatuses (6, 10) include an ending process element that, when a locked state is established within a reference period after operation of a parking mechanism (5), performs a normal ending process that stops a vehicle drive source (1) and switches to an ignition off position, and when the locked state is not established within the reference period, performs an abnormal ending process that stops the vehicle drive source (1) and switches to an accessory position; and a support process element that, when the parking mechanism (5) is operated, if a vehicle speed increase is detected, performs a support process that prohibits operation of the parking mechanism (5) and extends the reference period.

10 Claims, 8 Drawing Sheets

VEHICLE CONTROL APPARATUS

TECHNICAL FIELD

The present invention relates to a control apparatus used, for example, in a vehicle such as an automobile provided with a shift-by-wire parking mechanism that switches an output shaft of an automatic transmission installed in the vehicle between a locked state in which rotation is not possible, and an unlocked state in which rotation is possible.

BACKGROUND ART

A conventional automatic transmission is ordinarily configured so that by a driver sliding a sliding shift lever provided at the driver's seat, the force of that sliding operation is directly transmitted to a parking mechanism or a manual valve by a wire, a rod, or the like, and thus the driver selects, for example, any of a parking range P, a reverse (rearward travel) range R, a neutral range N, and a drive (forward travel) range D.

Here, when the parking range P has been selected, the parking mechanism establishes a locked state in which it is not possible to rotate an output shaft of the automatic transmission. When the reverse range R, the neutral range N, or the drive range D has been selected, the requested range is established by engaging or releasing a frictionally engaged element such as a clutch or a brake provided in a transmission mechanism unit by changing the state of a manual valve that is one constituent element of a shift range switching hydraulic circuit provided in the automatic transmission.

Next is a description of the configuration and operation of the above parking mechanism.

The parking mechanism is ordinarily configured to include a parking gear, a parking lock pole, and a parking rod.

The parking gear is externally fixed to the output shaft of the automatic transmission. The parking lock pole is supported so as to be capable of tilting to be displaced towards or away from the parking gear, and has a catch that can be engaged between teeth of the parking gear, or disengaged. A tapered cone for tilting the parking lock pole is provided at one end of the parking rod, and the parking rod is displaced frontward or rearward approximately parallel to the output shaft of the automatic transmission. This parking rod is driven by a detent lever that drives the manual valve.

As for operation of the parking mechanism, first, when the parking rod is, for example, displaced rearward by tilting the detent lever, the tapered cone pushes up the parking lock pole, so that the catch of the parking lock pole engages between the teeth of the parking gear, and thus the locked state in which it is not possible to rotate the output shaft of the automatic transmission is established.

On the other hand, when the parking rod is, for example, displaced frontward by tilting the detent lever in the opposite direction as described above, force of the tapered cone pushing up the parking lock pole is released, and the parking lock pole is pulled with a spring and thus moves downward, so the catch of the parking lock pole is pulled out from between the teeth of the parking gear, and thus the unlocked state in which it is possible to rotate the output shaft of the automatic transmission is established.

Incidentally, as the mode of operation of the detent lever, there is a so-called direct operation method in which the shift lever is directly linked in communication with the detent lever by, for example, a wire, a rod, or the like, and the detent lever is directly driven by operating force of the shift lever, and there is also a so-called shift-by-wire method.

In the shift-by-wire method, operation of the shift lever by the driver is detected with a sensor, a switch, or the like, and the detent lever is operated by an appropriate actuator according to the detected shift range signal (for example, see Patent Documents 1 and 2).

In the case of a shift-by-wire method, other than the above ordinary shift lever, a joystick, a push-button, or the like may be used as an operation member that outputs a parking request signal or a parking release request signal of the parking mechanism.

Further, when providing a shift-by-wire parking mechanism, it is known to perform so-called auto parking control in which, without operating the operation member, the parking mechanism is set to the locked state by driving the actuator when, for example, a predetermined condition has been established (e.g., see Patent Document 3).

Patent Document 1: JP H5-280637A
Patent Document 2: JP 2005-69407A
Patent Document 3: JP H6-72296A

DISCLOSURE OF INVENTION

Problem to be Solved by the Invention

In a shift-by-wire parking mechanism as in the above conventional example, first of all, in comparison to a direct operation parking mechanism that establishes the locked state directly by operation of the shift lever, a predetermined time lag occurs from when a parking request for switching the parking mechanism from the unlocked state to the locked state is received until the locked state is established.

During the period of this time lag, i.e., in the passage of time from the parking request to establishment of the locked state, if, for example, the driver releases the brake, for example, in a circumstance in which the vehicle is inclined due to the vehicle being stopped on a hill, there is a risk that the vehicle will roll according to that incline, and therefore there is a concern that the locked state will be difficult to establish.

In other words, first of all, for example, if the vehicle rolls for some reason between operation of the parking mechanism and establishment of the locked state, a so-called ratcheting phenomenon will likely occur in which the parking gear, which is fixed to the output shaft of the automatic transmission, rotates and the catch of the parking lock pole is pulled without engaging with the parking gear.

With this sort of phenomenon, in auto parking control, there is a concern that the time until the locked state is established will be lengthened.

On the other hand, the inventors of the present invention considered the adoption of a configuration in which when the locked state has been established within a predetermined reference period, a normal ending process is performed that stops the engine and switches a vehicle electrical power source to an ignition off position, and when the locked state has not been established within the reference period, an abnormal ending process is performed that stops the engine and switches the vehicle electrical power source to an accessory position.

However, with such a measure, in a circumstance in which auto parking control is executed on a hill, there is a risk that it will not be possible to establish the locked state within the reference period, with the likely result that the abnormal ending process will be performed. In that case, because there is no way for the driver to know that the abnormal ending process is performed, the driver will mistakenly think that the parking mechanism is in the locked state, and additionally, because the vehicle electrical power source is set to the accessory position and not to the ignition off position, this leads to distrust by the driver, for example, and therefore such a configuration is not preferable. With respect to this point, there is room for improvement.

It is an object of the present invention to provide, in a control apparatus used in a vehicle having a shift-by-wire parking mechanism that switches an output shaft of an automatic transmission between a locked state in which rotation is not possible, and an unlocked state in which rotation is possible, technology that allows a circumstance in which a normal ending process can be performed to be ensured as rapidly as possible, even when the vehicle has rolled, particularly in a circumstance such as executing auto parking control on a hill.

Means for Solving Problem

The present invention is configured as follows, in a vehicle having a shift-by-wire parking mechanism that switches an output shaft of an automatic transmission between a locked state in which rotation is not possible, and an unlocked state in which rotation is possible.

The vehicle control apparatus includes: a control element that executes an auto parking control that sets the parking mechanism to the locked state when a request to switch a vehicle electrical power source from an ignition on position to an ignition off position has been received and a vehicle stop condition has been established; an ending process element that, after operation of the parking mechanism by the auto parking control, when the locked state has been established within a reference period, performs a normal ending process that stops a vehicle drive source and switches a vehicle electrical power source to an ignition off position, and when the locked state has not been established within the reference period, performs an abnormal ending process that stops the vehicle drive source and switches the vehicle electrical power source to an accessory position; and a support process element that, when an increase in vehicle speed is detected when the parking mechanism is operated by the auto parking control, performs a support process that prohibits operation of the parking mechanism and extends the reference period.

The accessory (ACC) position is a state in which power supply to car accessories such as audio installed in the vehicle is possible. The ignition (IG) on position is a state in which power supply to electric components other than the above car accessories, such as a car air conditioner, is possible. A start (ST) position is a state in which power can be supplied to a starter motor, in addition to electric components such as a car air conditioner. The ignition (IG) off position is a state in which power is not supplied to any of the car accessories, the electric components such as a car air conditioner, the starter motor, or the like.

Switching of the vehicle electrical power source position, for example, is performed in response to operation of a start/ stop switch in the case of a push-button start system, or operation of an ignition key in the case of a mechanical key start system, and also is performed in response to a control request.

First of all, in a circumstance in which auto parking control is executed on a hill, if the driver releases brake operation immediately after an auto parking control request, the vehicle may roll due to the inclined road surface, so that the locked state is difficult to establish. In such a circumstance, in the case of the measures of the above-described conventional example, there is a risk that it will not be possible to establish the locked state within the reference period, with a likely result that the abnormal ending process will be performed. Thus, the driver may mistakenly believe that the parking mechanism is in the locked state, and also, the driver may feel mistrust because the vehicle electrical power source is set to the accessory position and does not switch to the ignition off position, for example. Therefore, the above conventional example is not preferable.

On the other hand, with the above configuration of the present invention, when the vehicle rolls immediately after starting execution of auto parking control on a hill or the like, a support process such as extending the auto parking control reference period is performed, so for example, it is possible to anticipate that the driver will notice the vehicle movement and operate the brake by the driver's own initiative.

Thus, even in a circumstance in which, for example, auto parking control is executed on a hill or the like, by stopping the vehicle with brake operation by the driver, it is possible to establish the locked state and perform the normal ending process. Accordingly, it is possible to avoid excessive mistakes or mistrust by the driver, for example, thus contributing to an improvement in reliability.

The present invention can be configured in the following manner in a vehicle control apparatus used in a vehicle that employs a shift-by-wire parking mechanism that, as necessary, switches an output shaft of an automatic transmission between a locked state in which rotation is not possible and an unlocked state in which rotation is possible.

That is, the vehicle control apparatus of the present invention includes a first control element that outputs a request to execute an auto parking control that sets the parking mechanism to the locked state when a request to switch a vehicle electrical power source from an ignition on position to an ignition off position has been received and a vehicle stop condition has been established, and a second control element that executes the auto parking control in response to input of that execution request.

The first control element includes a first determination element that determines whether or not a locked state establishment report has been received from the second control element before a predetermined reference period since output of the execution request has passed; and an ending process element that, when determined that the establishment report has been received, performs a normal ending process that stops a vehicle drive source and switches the vehicle electrical power source to the ignition off position, and when determined that that the establishment report has not been received, performs an abnormal ending process that stops the vehicle drive source and switches the vehicle electrical power source to an accessory position.

The second control element includes a second determination element that determines whether or not there is an increase in vehicle speed when the auto parking control execution request has been input; a support process element that, when determined that the vehicle speed has not increased, allows the parking mechanism to operate, and when determined that the vehicle speed has increased, performs a support process that prohibits operation of the parking mechanism and outputs an extension request to extend the reference period to the first control element; and a reporting element that outputs an establishment report to the first control element when the locked state has been established by operation of the parking mechanism.

Here, a function realizing means for realizing characteristic processes according to the present invention is specified.

Preferably, the reference period is managed by a guard timer provided in the first control element, and the support process of the support process element extends the reference period by increasing a time-up threshold value of the guard timer. In this way, it is possible to specify the guard timer as a reference period measurement element.

Preferably, the support process element includes a configuration that performs a process that, when the support process has been executed, notifies the driver of extension of the reference period.

With this configuration, the driver can easily recognize that the implementation time of auto parking control is lengthened, and is given a supporting awareness that the driver has to operate the brake, for example, so that it is possible to ensure a condition in which the locked state is easily established.

Preferably, the support process element includes a configuration that, when the support process has been executed, performs a process that notifies a driver of extension of the reference period and requests that the driver operate a brake.

With this configuration, the driver can easily recognize that the implementation time of auto parking control is lengthened, and be caused to affirmatively operate the brake, for example, so that it is possible to ensure a condition in which the locked state is easily established.

Preferably, the support process element includes a configuration that, when the support process has been executed, after notifying the driver of extension of the reference period, automatically performs a process that cuts off power transmission from the automatic transmission to drive wheels, and a process that causes the brake to be operated.

With this configuration, the driver can easily recognize that the implementation time of auto parking control is lengthened, and by automatically not allowing drive power to be transmitted to the drive wheels from the automatic transmission and forcibly causing the brake to be operated, a circumstance in which the locked state is easily established is ensured.

Preferably, the parking mechanism includes: a parking gear that is externally fixed to the output shaft of the automatic transmission; a parking lock pole that has a catch that is engaged with the parking gear, and is displaced such that the catch is engaged with the parking gear to put the parking gear in the locked state in which rotation is not possible, and the catch is disengaged from the parking gear to put the parking gear in the unlocked state in which rotation is possible; a parking rod that is pushed or pulled so as to be displaced towards or away from the parking gear; a detent lever that is supported so as to be capable of tilting to push or pull the parking rod; and an actuator for tilting the detent lever by a predetermined angle in an appropriate direction.

Here, the configuration of the parking mechanism is specified, from which it is clear that the actuator is controlled when executing auto parking control.

EFFECTS OF THE INVENTION

According to the present invention, a circumstance in which a normal ending process can be performed can be ensured as rapidly as possible, even when the vehicle has rolled, particularly in a circumstance such as executing auto parking control on a hill.

In other words, with the present invention, when the vehicle has rolled in the above sort of circumstance in which auto parking control is executed on a hill, performance of the abnormal ending process in which the vehicle electrical power source is set to the accessory position can be avoided as much as possible. Accordingly, it is possible to avoid excessive mistakes or mistrust by the driver, for example, thus contributing to an improvement in reliability.

DESCRIPTION OF REFERENCE NUMERALS 1 engine
2 automatic transmission
3 drive wheels
4 brake
5 parking mechanism
6 power source ECU
10 SBW_ECU
11 start/stop switch
12 IG relay
13 ACC relay
14 notification apparatus
16 wheel speed sensor
25 output shaft of automatic transmission
51 parking gear
52 parking lock pole
52a catch of parking lock pole
53 parking rod
54 detent plate
55 latch lever
55a latch lever roller
56 control shaft
57 actuator

BEST MODE FOR CARRYING OUT THE INVENTION

Following is a detailed description of embodiments of the invention, with reference to FIGS. 1 to 8.

Embodiment 1

Embodiment 1 of the present invention is shown in FIGS. 1 to 6. Before describing features of the present invention, an overview of a powertrain of a vehicle to which the present invention is applied will be described with reference to FIG. 1.

Figure 1:
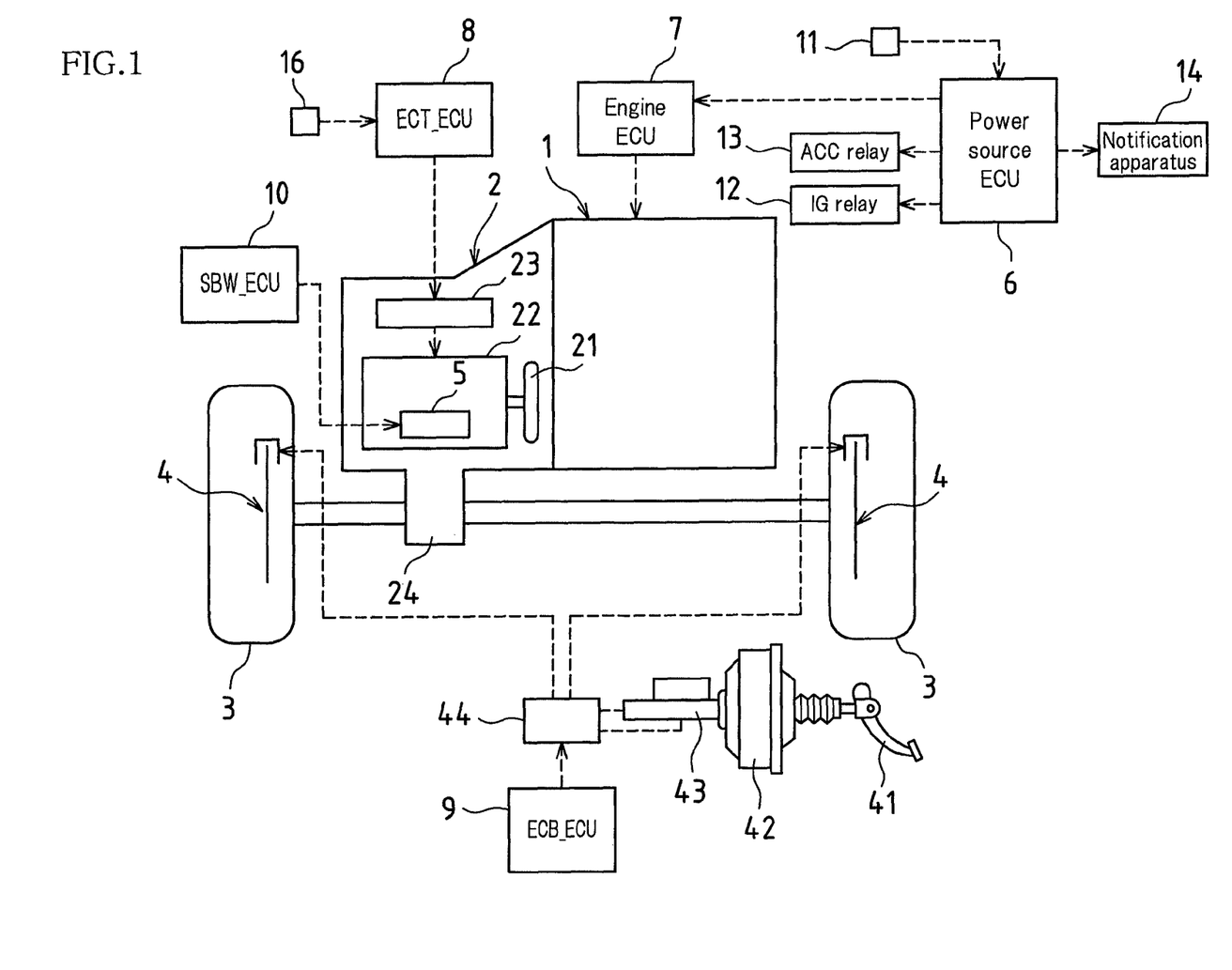
FIG. 1 is a schematic configuration view that shows, in Embodiment 1 of a vehicle control apparatus according to the present invention, a vehicle powertrain to which the control apparatus of the present invention is applied.

FIG. 1 shows a front engine/front drive (FF)-type powertrain. As shown in FIG. 1, this powertrain includes an engine 1 as a drive source, an automatic transmission 2, drive wheels 3, foot-operated brakes 4, a parking mechanism 5, a power source ECU (Electronic Control Unit) 6, an engine ECU 7, an ECT (Electronic Controlled Automatic Transmission)_ECU 8, an ECB (Electronically Controlled Brake System)_ECU 9, and an SBW (Shift By Wire)_ECU 10.

These basic constituents are configured in a manner that is ordinarily commonly known, and so a simple description is given for portions that are not directly concerned with the present invention.

The engine 1 is a gasoline engine, a diesel engine, or the like, and operation of the engine 1 is controlled by the engine ECU 7.

The automatic transmission 2 is configured to include mainly a torque converter 21, a transmission mechanism unit 22, and a hydraulic circuit 23, and gearshift operation of the automatic transmission 2 is controlled by the ECT_ECU 8.

The transmission mechanism unit 22 of the automatic transmission 2 mainly includes, although not shown, a plurality of planetary mechanisms, frictionally engaging elements such as a clutch and a brake, a one-way clutch, and the like, and establishes a requested gear by engaging or releasing the frictionally engaging elements according to an operation chart that is predefined in the ECT_ECU 8.

The hydraulic circuit 23, although not shown, has at least a manual valve, and secures a hydraulic path to the appropriate frictionally engaging elements so as to correspond to, for example, each of a reverse (rearward travel) range R, a neutral range N, and a drive (forward travel) range D.

The drive wheels 3 are rotationally driven due to forward drive power and rearward drive power being transmitted via a differential 24 disposed in the automatic transmission 2 and a wheel axle (reference omitted).

The brakes 4 are, for example, hydraulic disk brakes, and apply frictional force to disk rotors (reference omitted) when the driver has depressed a brake pedal 41 that is provided within the vehicle cabin, thus applying braking force to the drive wheels 3.

The brakes 4 may also be drum brakes. Ordinarily, the depression force (pedal force) is amplified by a booster 42 and a master cylinder 43, so that a strong braking force is obtained with a light pedal force.

With respect to these brakes 4, ordinarily, in order to realize a commonly known braking assist function or an anti-lock braking function, a brake hydraulic control unit 44 is provided somewhere in a hydraulic path from the master cylinder 43 to a brake caliper (reference omitted), and this brake hydraulic control unit 44 is appropriately controlled by the ECB_ECU 9.

Figure 2:
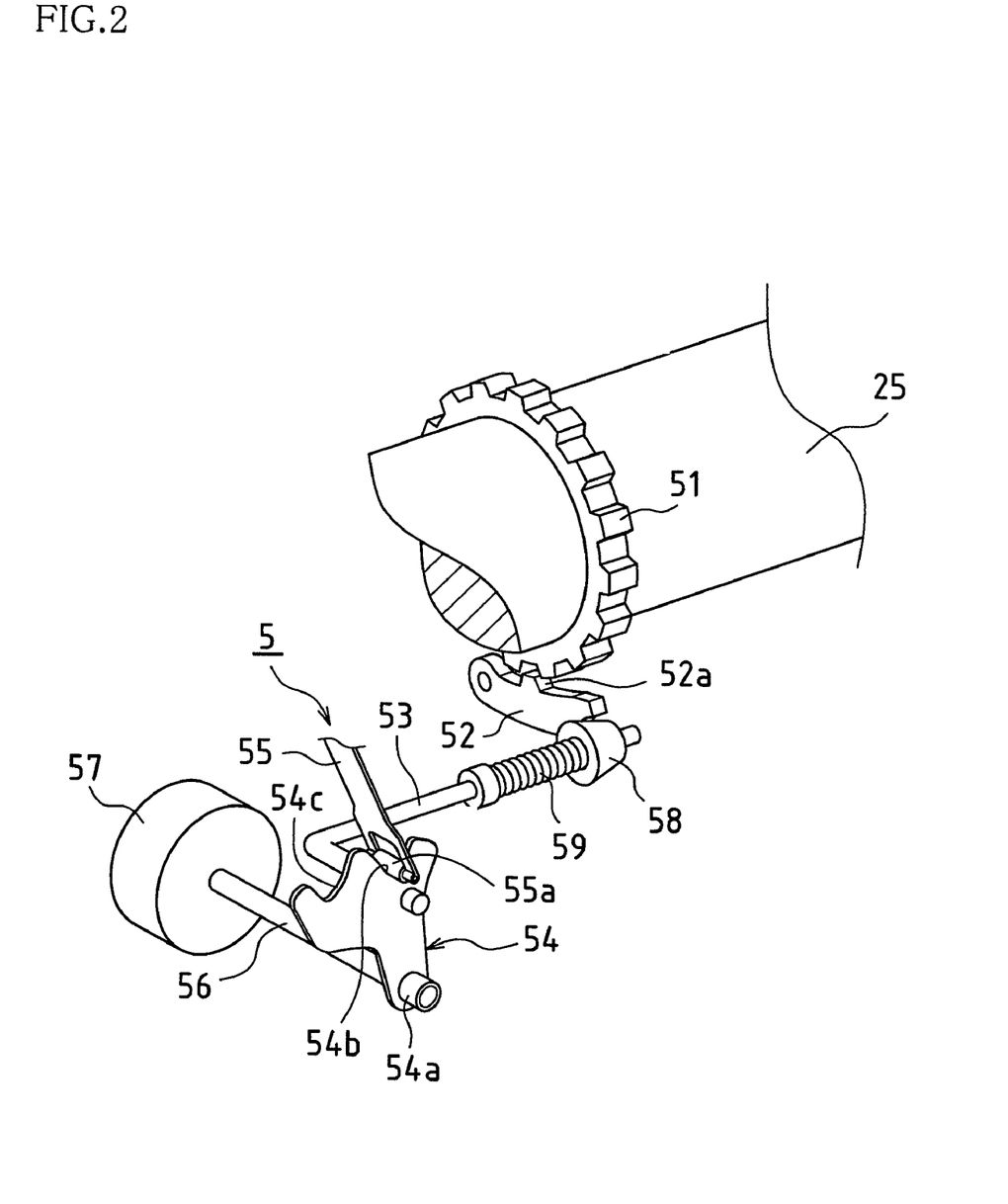
FIG. 2 is a perspective view that shows the schematic configuration of a parking mechanism in FIG. 1, and shows an unlocked state.
Figure 3:
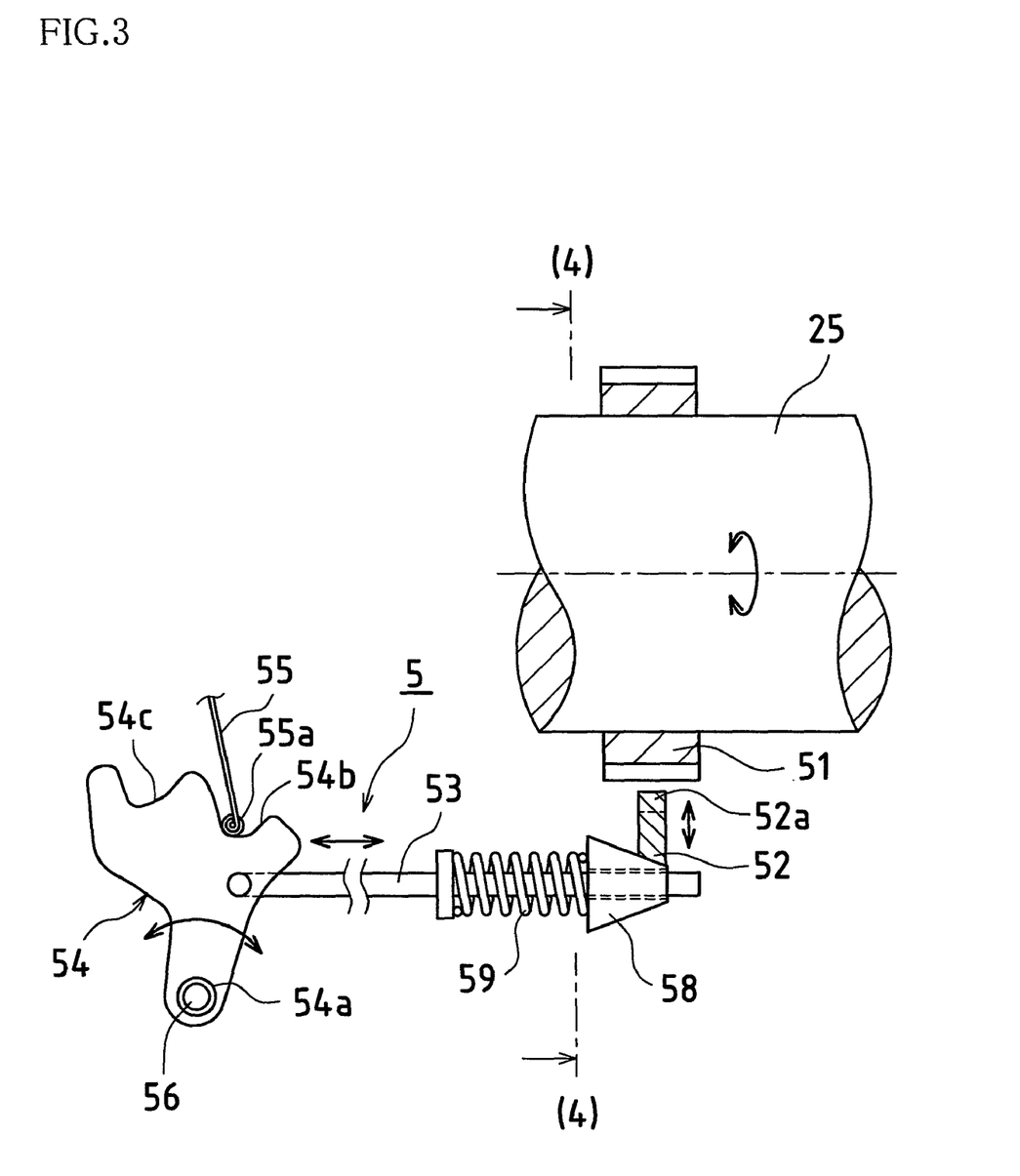
FIG. 3 is a side view of the parking mechanism in FIG. 2.
Figure 4:
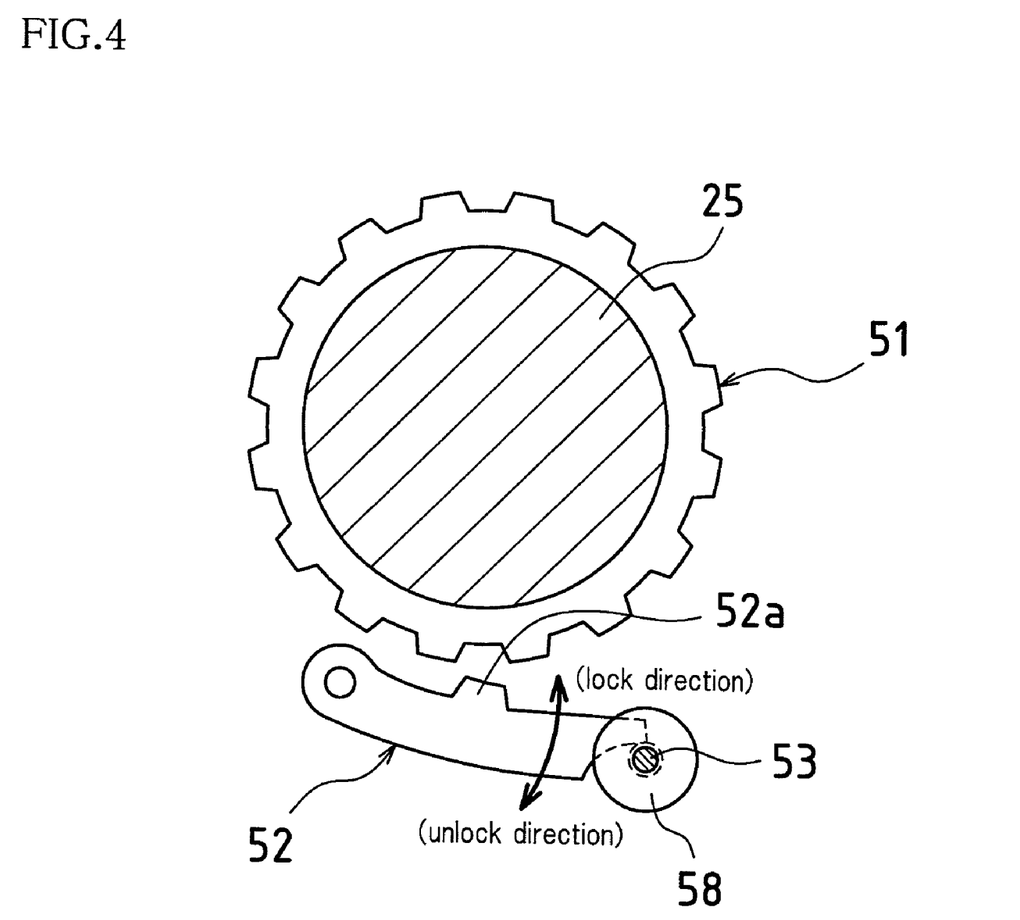
FIG. 4 is a view in the direction of the arrows of cross-section (4)-(4) in FIG. 3.

The parking mechanism 5 is configured as shown in FIGS. 2 to 4, and has a so-called shift-by-wire configuration in which, as necessary, the parking mechanism 5 establishes a locked state in which it is not possible to rotate an output shaft 25 of the automatic transmission 2, and an unlocked state in which rotation is possible.

Note that the output shaft 25 of the automatic transmission 2, for example, is a counter drive gear or the like, but another motive power transmission shaft can also be used as the output shaft 25.

This parking mechanism 5, specifically, is configured to include mainly a parking gear 51, a parking lock pole 52, a parking rod 53, a detent lever 54, a latch lever 55, a control shaft 56, and an actuator 57.

The parking gear 51 is externally fixed to the output shaft 25 of the automatic transmission 2, such that they can rotate together as a single body.

The parking lock pole 52 is disposed near the parking gear 51 so as to be capable of tilting with one end as a fulcrum. A catch 52a that can be engaged between teeth of the parking gear 51 or disengaged is provided somewhere in the lengthwise direction of the parking lock pole 52.

The parking rod 53 is disposed so as to be displaced to the front end side or the rear end side approximately parallel to the output shaft 25 by tilting operation of the detent lever 54.

As shown in FIG. 2, the front end of the parking rod 53 is linked to the detent lever 54, and a tapered cone 58 for tilting the parking lock pole 52 is provided at the rear end of the parking rod 53.

The tapered cone 58 is pushed to the parking gear 51 side by a coil spring 59. The coil spring 59 is provided on the outside of the parking rod 53, and one end of the coil spring 59 is received by a snap ring (reference omitted) that is fastened to the parking rod 53.

A cylindrical boss portion 54a is integrally formed at a tilting center of the detent lever 54 and is externally fitted by, for example, spline fitting so as to be capable of rotating as a single body together with the control shaft 56. Two grooves 54b and 54c are provided at the upper end side of the detent lever 54.

The parking rod 53 is linked to this detent lever 54. As the mode of this linking, for example, a bent end of the parking rod 53 is inserted into a through hole provided at a predetermined position of the detent lever 54, and then this bent end is retained/fixed with an unshown snap ring, fastening pin, or the like.

The latch lever 55 maintains the tilt attitude of the detent lever 54, and is configured so that at the other end of a main body made of a plate spring or the like, one end of which has been fixed to an automatic transmission case (not shown) or the like, a roller 55a is provided that engages with the grooves 54b and 54c provided in the detent lever 54. The roller 55a of the latch lever 55 engages with the first groove 54b when parking is released, and engages with the second groove 54c when parking is implemented.

The control shaft 56 is rotatably supported by the unshown automatic transmission case or the like, and is rotationally driven by a predetermined angle in the clockwise or counterclockwise direction by the actuator 57.

Although not shown, the actuator 57 is configured to include an appropriate motor and a speed reduction mechanism (for example, such as a worm gear or a planetary mechanism). The actuator 57 is electrically controlled by the SBW_ECU 10.

The power source ECU 6 manages a vehicle electrical power source by controlling an ignition (IG) relay 12, an accessory (ACC) relay 13, and the like in response to operation of a start/stop switch 11 disposed within the vehicle cabin or another control request.

The start/stop switch 11 is constituted by a push button, and is provided in a so-called push button start-type vehicle.

The start/stop switch 11 is assigned such that when the vehicle electrical power source is in the ignition off position, in a state with the brake pedal depressed, when the start/stop switch 11 is operated by pressing once, the start/stop switch 11 is put in a start (ST) position that starts the engine 1, but in a state in which the brake pedal is not depressed, the vehicle electrical power source position is switched each time the start/stop switch 11 is operated by pressing, such that when the start/stop switch 11 is operated by pressing once, the vehicle electrical power source is set to an accessory position, when the start/stop switch 11 is further operated by pressing, the vehicle electrical power source is set to an ignition on position, and when the start/stop switch 11 is further operated by pressing, the vehicle electrical power source is set to an ignition off position.

Also, the start/stop switch 11 has a failsafe function in which when the start/stop switch 11 has been operated by pressing during vehicle running, the power source is not switched, and also has an exceptional provision whereby a specific process is performed, for example, only when the start/stop switch 11 has been continuously depressed for at least a predetermined time.

The accessory (ACC) position is a state in which power supply to car accessories such as audio installed in the vehicle is possible. The ignition (IG) on position is a state in which power supply to electric components other than the above car accessories, such as a car air conditioner, is possible. The start (ST) position is a state in which power is supplied to a starter motor, in addition to electric components such as a car air conditioner. The ignition (IG) off position is a state in which power is not supplied to any of the car accessories, the electric components such as a car air conditioner, the starter motor, or the like.

However, the present invention is also applicable to a mechanical key start-type vehicle, and in that case, an ignition key is provided instead of the above start/stop switch 11.

Each of the above ECUs 6, 7, 8, 9, and 10 is configured as is ordinarily commonly known to include a CPU, a ROM, a RAM, a backup RAM, and the like, and the ECUs are capable of bi-directionally sending/receiving necessary information to/from each other. Various control programs, maps referred to when executing those various programs, and the like are stored in the ROM. The CPU executes various computational processes based on the various control programs and maps stored in the ROM. The RAM is a memory that temporarily stores results of computation by the CPU, data that has been input from various sensors, and the like. The backup RAM, for example, is a nonvolatile memory that stores data to be saved when the engine 1 is stopped, or the like.

Following is a description of specific operation of this sort of parking mechanism 5.

First, when the parking mechanism 5 is in the unlocked state, when, by the SBW_ECU 10 controlling the actuator 57, the control shaft 56 is rotated by a predetermined angle in a locking direction, i.e. in the clockwise direction, the detent lever 54 is tilted in that same direction as a single body with the control shaft 56, and with this rotation, the parking rod 53 is pushed to the rear end side. Thus, when the large diameter side of the tapered cone 58 pushes the parking lock pole 52 upward, and the catch 52a is engaged between teeth of the parking gear 51, the output shaft 25 is put in the locked state in which rotation is not possible. At this time, the roller 55a is engaged with the second groove 54c of the detent lever 54, and the attitude of the detent lever 54 is fixed and maintained in that position.

On the other hand, when the parking mechanism 5 is in the locked state, when, by the SBW_ECU 10 controlling the actuator 57, the control shaft 56 is rotated by a predetermined angle in an unlocking direction, i.e. in the opposite rotation direction, the detent lever 54 is tilted in that same direction as a single body with the control shaft 56, and with this rotation, the parking rod 53 and the tapered cone 58 are pulled to the front end side. Thus, force of the tapered cone 58 pushing up the parking lock pole 52 is released, so the parking lock pole 52 moves downward, and the catch 52a of the parking lock pole 52 is pulled out from between the teeth of the parking gear 51. Also note that the parking lock pole 52 is always biased by an unshown spring in the direction that the parking gear 51 is pulled away. Therefore, the output shaft 25 is put in the unlocked state in which rotation is possible. At this time, the roller 55a is engaged with the first groove 54b of the detent lever 54, and the attitude of the detent lever 54 is fixed and maintained in that position.

Here is a detailed description of a portion in which the features of the present invention are applied.

That is, in Embodiment 1, the auto parking control that puts in the parking mechanism 5 in the locked state is executed when a predetermined condition has been established, but when the parking mechanism 5 is operated by the auto parking control, if, for example, the vehicle rolls or the like due to being stopped on a hill and thus the vehicle speed increases, auto parking control is caused to normally end as rapidly as possible by extending the reference period of the auto parking control, the driver is notified of that extension, and the driver is notified so as to request operation of the brakes 4.

An appropriate notification apparatus 14 is provided at the vehicle driver seat in order to notify the driver of extension of the reference period of auto parking control and to notify the driver of a request to operate the brakes 4.

As this notification apparatus 14, for example, a multi-information display provided in a meter panel (vehicle instrument panel) that is provided at the vehicle driver seat is used, and messages, symbols, or the like that indicate the notification content are displayed as necessary in this notification apparatus 14. The notification apparatus 14, for example, although not shown, is controlled with an ECU or the like dedicated to vehicle instruments.

Otherwise, as the notification apparatus 14, it is possible to use, for example, an appropriate lamp (such as an LED), a beeper that emits a warning sound, a dedicated display panel that displays the messages or symbols, or the like.

Figure 5:
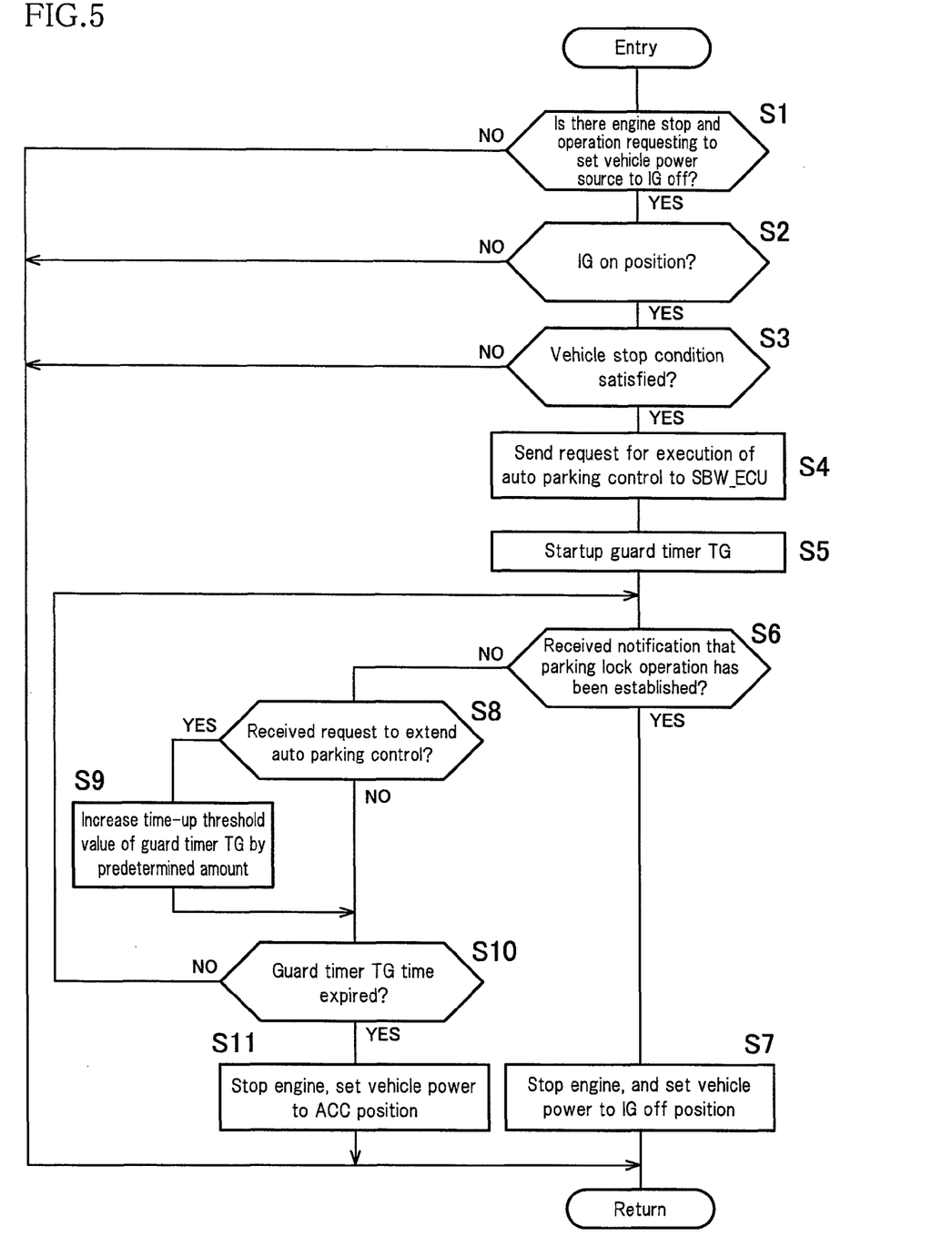
FIG. 5 is a flowchart used to illustrate an auto parking control operation by a power source ECU in Embodiment 1.
Figure 6:
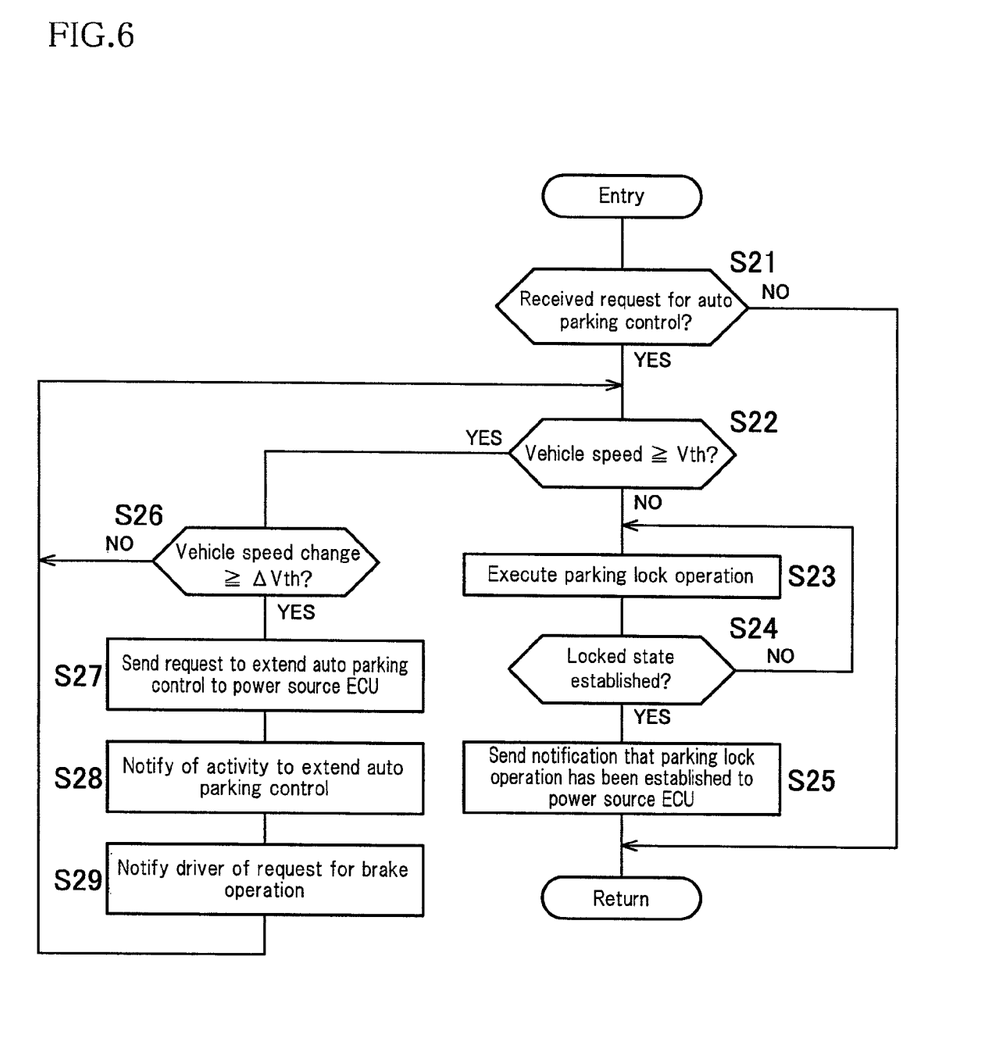
FIG. 6 is a flowchart used to illustrate an auto parking control operation by a SBW_ECU in Embodiment 1.

Below, the auto parking control of Embodiment 1 will be described with reference to the flowcharts in FIGS. 5 and 6. The flowchart shown in FIG. 5 illustrates a process during auto parking control by the power source ECU 6, and is entered at each instance of a constant time cycle. The flowchart shown in FIG. 6 illustrates a process during auto parking control by the SBW_ECU 10, and is entered at each instance of a constant time cycle.

In the description of the process by the power source ECU 6, first, in Steps S1 to S3, a check is performed of whether or not a condition that allows execution of the auto parking control is established.

Specifically, in Step S1, a determination is made of whether or not the start/stop switch 11 has been switched from the ignition on position to the ignition off position. Here, when the start/stop switch 11 has not been switched, a negative determination is made in Step S1, and this flowchart is exited, and when the start/stop switch 11 has been switched, an affirmative determination is made in Step S1, and the routine moves to Step S2.

In Step S2, a determination is made of whether or not the vehicle power source is in the ignition on position. Here, when the ignition relay 12 is in an unexcited, state, i.e., the vehicle power source is in the ignition off position, a negative determination is made in Step S1 and this flowchart is exited, and when the ignition relay 12 is in an excited state, i.e., the vehicle power source is in the ignition on position, an affirmative determination is made in Step S2, and the routine moves to Step S3.

In Step S3, a determination is made of whether or not a vehicle stop condition is established. A vehicle stop condition in this embodiment means that, for example, vehicle speed is less than a predetermined speed Vth (for example, 3 km/h) near zero. That is, this condition encompasses not only a state in which the vehicle is completely stopped, but also a state near stop in which the vehicle is slightly moving.

Vehicle speed detection can be performed, for example, in bidirectional communications with the ECT_ECU 8, by reading latest vehicle speed information that has been saved in a temporary storage area of the ECT_ECU 8. For example, the ECT_ECU 8 calculates vehicle speed based on, for example, output from a wheel speed sensor 16, and saves the results of that calculation in the temporary storage area as the latest vehicle speed.

Here, when the vehicle speed is at least the predetermined speed Vth, i.e., a vehicle stop condition is not established, a negative determination is made in Step S3 and this flowchart is exited, but when the vehicle speed is less than the predetermined speed Vth, i.e., a vehicle stop condition is established, an affirmative determination is made in Step S3 and the routine moves to Step S4.

In Step S4, an auto parking control execution request signal is sent to the SBW_ECU 10, and then, in the following Step S5, a guard timer TG is started, and then the routine moves to Step S6.

The guard timer TG is built into the power source ECU 6 and measures passage of a predetermined time. A predefined time-up threshold value is set in the guard timer TG. This time-up threshold value is set to a reference value that is appropriately determined by investigating, through experimentation or the like, the time needed from the start of auto parking control until the locked state of the parking mechanism 5 is established. This time is used as the reference period.

In above Step S6, a determination is made of whether or not a notification indicating that the locked state has been established by parking lock operation has been received from the SBW_ECU 10.

Here, when such an establishment notification has been received, an affirmative determination is made in Step S6, and in Step S7, the normal ending process is performed in which the engine 1 is stopped and the vehicle electrical power source is switched to the ignition off position. Then, this flowchart is exited.

However, when such an establishment notification has not been received, a negative determination is made in Step S6, and the routine moves to Step S8. In Step S8, a determination is made of whether or not a request to extend the auto parking control reference period has been received from the SBW_ECU 10.

Here, when an extension request has been received, an affirmative determination is made in Step S8, and in Step S9, a support process is performed that increases the time-up threshold value of the guard timer TG by a predetermined amount, and the routine moves to Step S10. On the other hand, when such an extension request has not been received, a negative determination is made in Step S8, and the routine moves to Step S10.

In Step S10, a determination is made of whether or not the guard time TG has expired. Here, when the guard time TG has not expired, a negative determination is made in Step S10 and the routine returns to Step S6, and when the guard time TG has expired, an affirmative determination is made in Step S10 and the routine moves to Step S11.

In Step S11, the abnormal ending process is performed in which the engine 1 is stopped and the vehicle electrical power source is switched to the accessory position. Then, this flowchart is exited.

Next is a description of a process by the SBW_ECU 10. First, in Step S21, a determination is made of whether or not an auto parking control execution request signal has been received from the power source ECU 6.

Here, when an execution request signal has not been received, a negative determination is made in Step S21 and this flowchart is exited, and when an execution request signal has been received, an affirmative determination is made in Step S21 and then the routine moves to the following Step S22.

In Step S22, a determination is made of whether or not the vehicle speed is at least the predetermined speed Vth (for example, 3 km/h) near zero. This vehicle speed detection can be performed, for example, in bidirectional communications with the ECT_ECU 8, by reading latest vehicle speed information that has been saved in the temporary storage area of the ECT_ECU 8. For example, the ECT_ECU 8 calculates vehicle speed based on output from the wheel speed sensor 16, and saves the results of that calculation in the temporary storage area as the latest vehicle speed.

Here, when the vehicle speed is less than the predetermined speed Vth, i.e., when the vehicle is in a stopped state or in an approximately stopped state, a negative determination is made in Step S22 and the routine moves to the normal process route of Steps S23 to S25. When the vehicle speed is at least the predetermined speed Vth, i.e., when the vehicle speed is increasing, an affirmative determination is made in Step S22 and the routine moves to the support process route of Steps S26 to S28.

First, in the normal process route, parking lock operation is executed by repeating Steps S23 and S24.

That is, in Step S23, by causing the actuator 57 of the parking mechanism 5 to operate as in the above operation description, the catch 52a of the parking lock pole 52 is caused to engage with the parking gear 51, thus establishing the locked state. This parking lock operation, as disclosed in JP 2005-69407A for example, preferably is executed after first setting the transmission mechanism unit 22 to the neutral range N.

Then, when it is determined in Step S24 that the locked state has been established, in Step S25, an establishment notification signal that indicates that the locked state has been established is sent to the power source ECU 6, and this flowchart is exited.

The determination in Step S24 can be performed by, for example, checking whether or not the detent lever 54 is in the attitude when the parking range P is established, based on a detection signal from an unshown sensor or the like.

In the support process route, first, in Step S26, a determination is made of whether or not the vehicle speed change (rate of increase) is at least a predetermined value ΔVth. Here, when the vehicle speed change is less than the predetermined value ΔVth, a negative determination is made in Step S26 and the routine returns to Step S22. When the vehicle speed change is at least the predetermined value ΔVth, an affirmative determination is made in Step S26 and the routine moves to Step S27.

In Step S27, an extension request signal for extending (increasing) the auto parking control reference period (time-up threshold value of the guard timer TG) is sent to the power source ECU 6, and then the routine moves to Step S28.

In Step S28, by displaying, for example, a message stating 'auto parking control is extended' in a multi-information display used as the notification apparatus 14, the driver is notified that the auto parking control is extended. Then, in Step S29, by displaying, for example, a message stating 'please operate the brake' in the multi-information display used as the notification apparatus 14, the driver is notified to operate the brake. Then, this flowchart is exited.

Note that in above Steps S28 and S29, it is possible to send a notification apparatus 14 operation request signal from the SBW_ECU 10 to the above-described unshown instrument control ECU, and to operate the notification apparatus 14 with this instrument control ECU.

Incidentally, as is clear from the above-described operation description, signals are sent and received between the power source ECU 6, serving as a first control element, and the SBW_ECU 10, serving as a second control element, and thus the work of auto parking control is divided among the power source ECU 6 and the SBW_ECU 10. Therefore, the vehicle control apparatus according to the present embodiment can be said to be configured to include both the power source ECU 6 and the SBW_ECU 10.

However, when the power source ECU 6 and the SBW_ECU 10 are configured as a single general control apparatus, rather than providing them separately, this general control apparatus corresponds to the vehicle control apparatus according to the present invention.

Otherwise, the power source ECU 6, the engine ECU 7, the ECT_ECU 8, the ECB_ECU 9, and the SBW_ECU 10 can all be configured as a single general control apparatus.

As described above, according to Embodiment 1 in which the features of the present invention are applied, when operating the parking mechanism 5 with the auto parking control, particularly in a circumstance such as when the vehicle is stopped on a hill, when judged that there is a possibility that it will not be possible to complete the auto parking control within the reference period due to the vehicle rolling, it is assumed that auto parking control will be lengthened, and a support process that extends that reference period is performed.

Moreover, in addition to performing the support process, the driver is notified of this extension action, and the driver is requested to operate the brakes 4.

Thus, for example, it is possible to identify a situation in which the driver cannot perform the normal auto parking control, and have the driver actively operate the brakes 4 to stop the vehicle. As a result, it is possible to establish the locked state and perform the normal ending process.

Accordingly, even in a circumstance in which, for example, the auto parking control is executed on a hill or the like, a circumstance in which the locked state of the parking mechanism 5 is easily established is ensured, so it is possible to avoid performing the abnormal ending process in which ending is performed with the vehicle electrical power source set to the accessory position. As a result, it is possible to avoid excessive mistakes or mistrust by the driver, thus contributing to an improvement in reliability.

Embodiment 2

Figure 7:
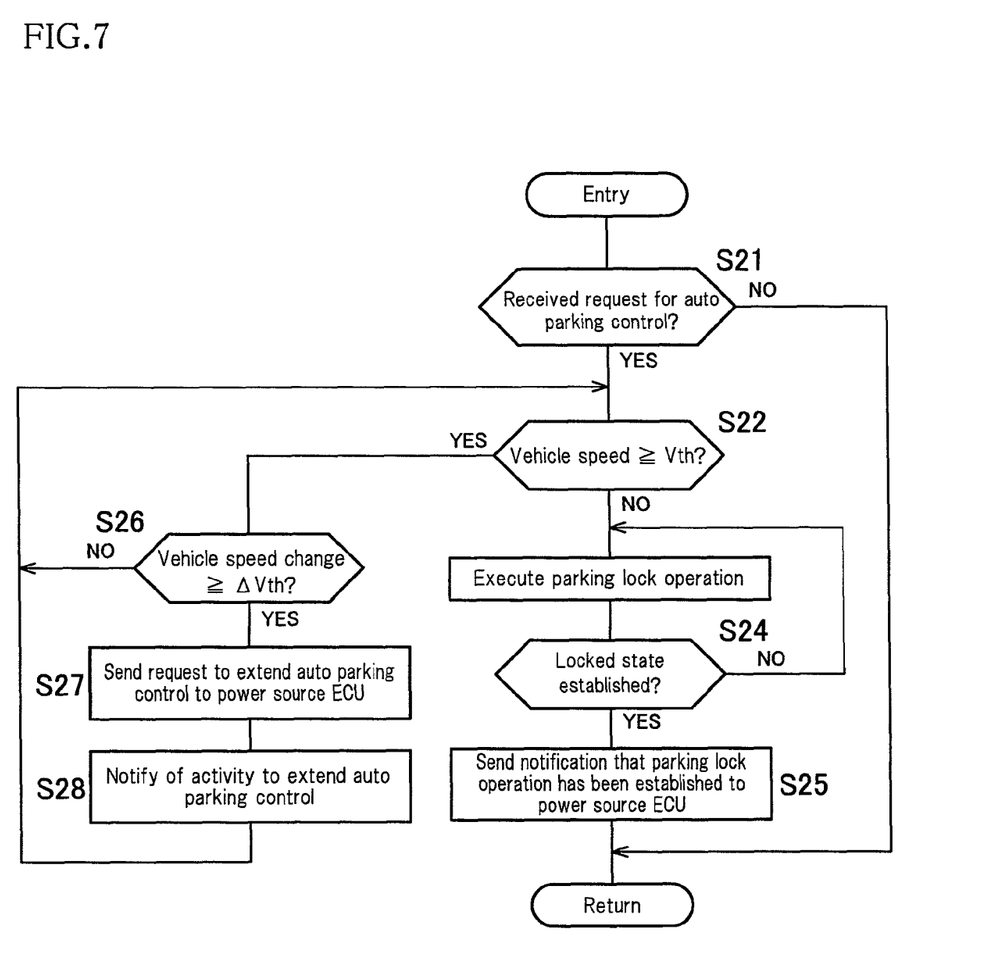
FIG. 7 is a flowchart used to illustrate an auto parking control operation by a SBW_ECU in Embodiment 2 of the vehicle control apparatus according to the present invention.

Embodiment 2 of the vehicle control apparatus according to the present invention will be described in detail with reference to FIG. 7, for example. FIG. 7 is a flowchart used to illustrate operation of auto parking control by an SBW_ECU.

Embodiment 2 is based on the configuration of above Embodiment 1, except that Step S29 (notification operation meaning brakes 4 operation request) of FIG. 6 is omitted.

In other words, when operating the parking mechanism 5 with the auto parking control, if, for example, the vehicle rolls or the like due to being stopped on a hill and thus the vehicle speed increases, the reference period is extended as in above Embodiment 1, and the driver is notified only of that extension.

Operation of the auto parking control by the power source ECU 6 is the same as in above Embodiment 1.

In the case of Embodiment 2 as well, for example, it is possible to anticipate that the driver will notice vehicle movement, and will operate the brakes 4 by the driver's own initiative. When the vehicle stops due to operation of the brakes 4, the locked state is easily established, so the configuration of Embodiment 2 is preferable.

Incidentally, in Embodiment 2, it is possible to also omit Step S28, and such a mode is also encompassed by the present invention. In the case of this mode, for example, when the vehicle rolls immediately after starting execution of auto parking control on a hill or the like, the support process that extends the reference period of auto parking control is performed, but the driver is not notified of extension of the auto parking control. However, even so, in the same manner as described above, the time for performing auto parking control is extended, so it is possible to anticipate an effect that the driver will stop the vehicle by operating the brake by the driver's own initiative, thus making the locked state easy to establish.

Embodiment 3

Figure 8:
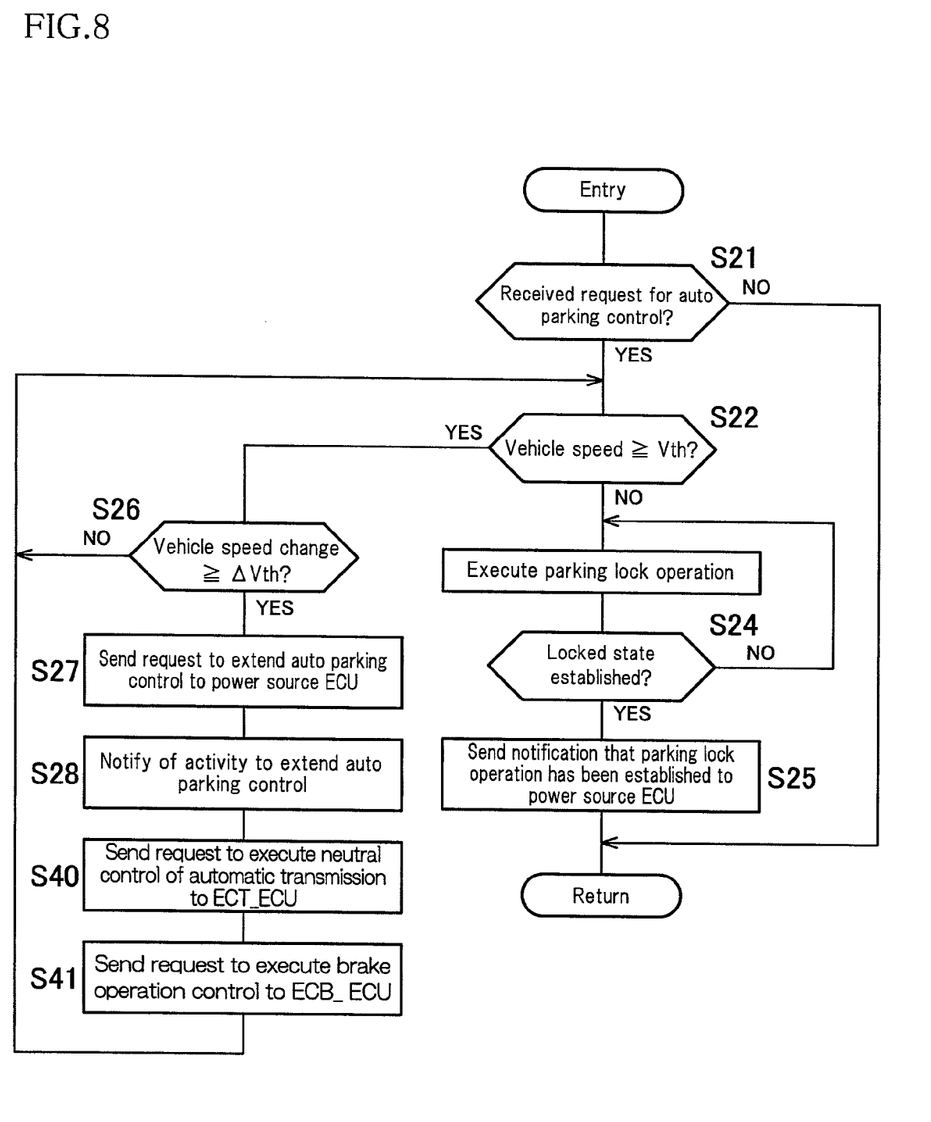
FIG. 8 is a flowchart used to illustrate an auto parking control operation by a SBW_ECU in Embodiment 3 of the vehicle control apparatus according to the present invention.

Embodiment 3 of the vehicle control apparatus according to the present invention will be described in detail with reference to FIG. 8, for example. FIG. 8 is a flowchart used to describe operation of auto parking control by an SBW_ECU.

Embodiment 3 is based on the configuration of above Embodiment 2, except that after Step S28 of FIG. 7, Steps S40 and S41 are added.

More specifically, in Embodiment 3, when operating the parking mechanism 5 with the auto parking control, if the vehicle speed has increased, the reference period is extended and an extension notification is issued as in Embodiment 2, and in addition, a process (Step 40 in FIG. 8) that cuts off drive power transmission from the automatic transmission 2 to the drive wheels 3, and a process (Step 41 in FIG. 8) that applies braking force to all of the drive wheels 3 by operating the brakes 4, are automatically performed.

The operation of auto parking control by the power source ECU 6 is the same as in above Embodiment 1.

Specifically, first, in Step S40, a request signal for setting the automatic transmission 2 to the neutral range N is sent from the SBW_ECU 10 to the ECT_ECU 8, and the neutral range N is established by the ECT_ECU 8 controlling the hydraulic circuit 23.

Note that Step S40 includes a process spanning from sending of the request signal for setting the automatic transmission 2 to the neutral range N from the SBW_ECU 10 to the ECT_ECU 8, to receiving of an establishment complete signal sent from the ECT_ECU 8 after establishment of the neutral range N by the SBW_ECU 10.

In the following Step S41, a brakes 4 operation request signal is sent from the SBW_ECU 10 to the ECB_ECU 9, and the brakes 4 are operated by the ECB_ECU 9 controlling the brake hydraulic control unit 44.

Note that Step S41 includes a process spanning from sending of the brakes 4 operation request signal from the SBW_ECU 10 to the ECB_ECU 9, to receiving of an operation complete signal sent from the ECB_ECU 9 after operation of the brakes 4 is completed by the SBW_ECU 10.

As described above, in Embodiment 3 in which the features of the present invention are applied, the driver can easily recognize that the implementation time of auto parking control is lengthened, and by automatically not allowing drive power to be transmitted to the drive wheels 3 from the automatic transmission 2 and forcibly causing the brakes 4 to be operated, a circumstance in which the locked state is easily established is ensured.

Thus, even in a circumstance in which, for example, the auto parking control is executed on a hill or the like, the locked state is established and the normal ending process can be performed, so it is possible to avoid performing the abnormal ending process in which ending is performed with the vehicle electrical power source set to the accessory position.

As a result, it is possible to avoid excessive mistakes or mistrust by the driver, thus contributing to an improvement in reliability.

In particular, in Embodiment 3, because drive power is not transmitted to the drive wheels 3, the working hydraulic pressure applied to the brake hydraulic control unit 44 in order to operate the brakes 4 is reduced. Embodiment 3 is advantageous from this perspective.

The present embodiment is not limited to the above embodiments, and all modifications or applications that come within the meaning and range of equivalency of the claims are possible. Examples are given below.

(1) In above Embodiments 1 to 3, for example, the engine 1 is used as the power source of the vehicle, but the invention is also applicable to a hybrid vehicle that employs both an engine and a motor, or to a vehicle that employs only a motor.

(2) In above Embodiments 1 to 3, for example, the vehicle is a front engine/front drive (FF)-format vehicle, but the invention is also applicable to a vehicle having a front engine/rear drive (FR) format or another format.

(3) In above Embodiments 1 to 3, for example, the transmission mechanism unit 22 of the automatic transmission 2 is a planetary mechanism, but for example, various stepless gearshift mechanisms can also be used for the transmission mechanism unit 22. Examples of these stepless gearshift mechanisms include a belt-driven stepless transmission (CVT: Continuously Variable Transmission) and a toroidal stepless transmission.

The present invention may be embodied in various other forms without departing from the spirit or essential characteristics thereof. The embodiments disclosed in this application are to be considered in all respects as illustrative and not limiting. The scope of the invention is indicated by the appended claims rather than by the foregoing description, and all modifications or changes that come within the meaning and range of equivalency of the claims are intended to be embraced therein.

This application claims priority on Japanese Patent Application No. 2007-137688 filed in Japan on May 24, 2007, the entire contents of which are herein incorporated by reference. Furthermore, the entire contents of references cited in the present description are herein specifically incorporated by reference.

INDUSTRIAL APPLICABILITY

The vehicle control apparatus of the present invention is a control apparatus used, for example, in a vehicle provided with a shift-by-wire parking mechanism that switches an output shaft of an automatic transmission between a locked state in which rotation is not possible, and an unlocked state in which rotation is possible, wherein it is possible to ensure a circumstance in which it is possible to perform a normal ending process as rapidly as possible, particularly even when the vehicle has rolled in a circumstance in which auto parking control is executed on a hill. Accordingly, the present invention is useful.

The invention claimed is:

1. A vehicle control apparatus in a vehicle provided with a shift-by-wire parking mechanism that switches an output shaft of an automatic transmission between a locked state in which rotation is not possible, and an unlocked state in which rotation is possible, the vehicle control apparatus comprising:
a control element that executes an auto parking control that sets the parking mechanism to the locked state when a request to switch a vehicle electrical power source from an ignition on position to an ignition off position has been received and a vehicle stop condition has been established,
an ending process element that, after operation of the parking mechanism by the auto parking control, when the locked state has been established within a reference period, performs a normal ending process that stops a vehicle drive source and switches the vehicle electrical power source to the ignition off position, and when the locked state has not been established within the reference period, performs an abnormal ending process that stops the vehicle drive source and switches the vehicle electrical power source to an accessory position; and
a support process element that, if an increase in vehicle speed is detected when the parking mechanism is operated by the auto parking control, performs a support process that prohibits operation of the parking mechanism and extends the reference period.

2. A vehicle control apparatus used in a vehicle that employs a shift-by-wire parking mechanism that, as necessary, switches an output shaft of an automatic transmission between a locked state in which rotation is not possible and an unlocked state in which rotation is possible, the vehicle control apparatus comprising:
a first control element that outputs a request to execute an auto parking control that sets the parking mechanism to the locked state when a request to switch a vehicle electrical power source from an ignition on position to an ignition off position has been received and a vehicle stop condition has been established, and a second control element that executes the auto parking control in response to input of that execution request;
the first control element including a first determination element that determines whether or not a locked state establishment report has been received from the second control element before a predetermined reference period since output of the execution request has passed, and an ending process element that, when determined that the establishment report has been received, performs a normal ending process that stops a vehicle drive source and switches the vehicle electrical power source to the ignition off position, and when determined that the establishment report has not been received, performs an abnormal ending process that stops the vehicle drive source and switches the vehicle electrical power source to an accessory position; and
the second control element including a second determination element that determines whether or not there is an increase in vehicle speed when the auto parking control execution request has been input, a support process element that, when determined that the vehicle speed has not increased, allows the parking mechanism to operate, and when determined that the vehicle speed has increased, performs a support process that prohibits operation of the parking mechanism and outputs an extension request to extend the reference period to the first control element, and a reporting element that outputs an establishment report to the first control element when the locked state has been established by operation of the parking mechanism.

3. The vehicle control apparatus according to claim 2, wherein the reference period is managed by a guard timer provided in the first control element, and the support process of the support process element extends the reference period by increasing a time-up threshold value of the guard timer.

4. The vehicle control apparatus according to claim 1, wherein the support process element includes a configuration that, when the support process has been executed, performs a process that notifies a driver of extension of the reference period.

5. The vehicle control apparatus according to claim 1, wherein the support process element includes a configuration that, when the support process has been executed, performs a process that notifies a driver of extension of the reference period and requests that the driver operate a brake.

6. The vehicle control apparatus according to claim 1, wherein the support process element includes a configuration that, when the support process has been executed, after notifying the driver of extension of the reference period, automatically performs a process that cuts off power transmission from the automatic transmission to drive wheels, and a process that causes the brake to be operated.

7. The vehicle control apparatus according to claim 1, the parking mechanism comprising:
   a parking gear that is externally fixed to the output shaft of the automatic transmission,
   a parking lock pole that has a catch that is engaged with the parking gear, and is displaced such that the catch is engaged with the parking gear to put the parking gear in the locked state in which rotation is not possible, and the catch is disengaged from the parking gear to put the parking gear in the unlocked state in which rotation is possible,
   a parking rod that is pushed or pulled so as to be displaced towards or away from the parking gear,
   a detent lever that is supported so as to be capable of tilting to push or pull the parking rod, and
   an actuator for tilting the detent lever by a predetermined angle in an appropriate direction.

8. The vehicle control apparatus according to claim 4, wherein the parking mechanism includes:
   a parking gear that is externally fixed to the output shaft of the automatic transmission;
   a parking lock pole that has a catch that is engaged with the parking gear, and is displaced such that the catch is engaged with the parking gear to put the parking gear in the locked state in which rotation is not possible, and the catch is disengaged from the parking gear to put the parking gear in the unlocked state in which rotation is possible,
   a parking rod that is pushed or pulled so as to be displaced towards or away from the parking gear,
   a detent lever that is supported so as to be capable of tilting to push or pull the parking rod, and
   an actuator for tilting the detent lever by a predetermined angle in an appropriate direction.

9. The vehicle control apparatus according to claim 5, wherein the parking mechanism includes:
   a parking gear that is externally fixed to the output shaft of the automatic transmission;
   a parking lock pole that has a catch that is engaged with the parking gear, and is displaced such that the catch is engaged with the parking gear to put the parking gear in the locked state in which rotation is not possible, and the catch is disengaged from the parking gear to put the parking gear in the unlocked state in which rotation is possible,
   a parking rod that is pushed or pulled so as to be displaced towards or away from the parking gear,
   a detent lever that is supported so as to be capable of tilting to push or pull the parking rod, and
   an actuator for tilting the detent lever by a predetermined angle in an appropriate direction.

10. The vehicle control apparatus according to claim 6, wherein the parking mechanism includes:
    a parking gear that is externally fixed to the output shaft of the automatic transmission;
    a parking lock pole that has a catch that is engaged with the parking gear, and is displaced such that the catch is engaged with the parking gear to put the parking gear in the locked state in which rotation is not possible, and the catch is disengaged from the parking gear to put the parking gear in the unlocked state in which rotation is possible,
    a parking rod that is pushed or pulled so as to be displaced towards or away from the parking gear,
    a detent lever that is supported so as to be capable of tilting to push or pull the parking rod, and
    an actuator for tilting the detent lever by a predetermined angle in an appropriate direction.

* * * * *